United States Patent
Hillman et al.

(10) Patent No.: US 12,062,957 B2
(45) Date of Patent: Aug. 13, 2024

(54) AXIAL FLUX MACHINE SHOE OPTIMISATION

(71) Applicant: YASA Limited, Kidlington (GB)

(72) Inventors: Tom Hillman, Kidlington (GB); Richard Phillips, Banbury (GB); Tim Woolmer, Waterperry (GB)

(73) Assignee: YASA Limited, Kidlington (GB)

( * ) Notice: Subject to any disclaimer, the term of this patent is extended or adjusted under 35 U.S.C. 154(b) by 54 days.

(21) Appl. No.: 17/580,794

(22) Filed: Jan. 21, 2022

(65) Prior Publication Data
US 2022/0239210 A1     Jul. 28, 2022

(30) Foreign Application Priority Data
Jan. 22, 2021  (GB) ...................... 2100859

(51) Int. Cl.
*H02K 1/14*  (2006.01)
*H02K 1/18*  (2006.01)
(Continued)

(52) U.S. Cl.
CPC ............. *H02K 29/03* (2013.01); *H02K 1/148* (2013.01); *H02K 1/182* (2013.01); *H02K 21/24* (2013.01); *H02K 1/2798* (2022.01)

(58) Field of Classification Search
CPC ...... H02K 1/148; H02K 1/182; H02K 1/2793; H02K 1/2795; H02K 1/2796; H02K 1/2798; H02K 21/24; H02K 29/03
See application file for complete search history.

(56) References Cited

U.S. PATENT DOCUMENTS

| | | | |
|---|---|---|---|
| 7,233,090 B2 | 6/2007 | Evans et al. | |
| 2002/0067091 A1* | 6/2002 | Kliman | H02K 1/14 310/156.01 |

(Continued)

FOREIGN PATENT DOCUMENTS

| | | |
|---|---|---|
| CN | 110492629 A | 11/2019 |
| EP | 2618466 A1 | 7/2013 |

(Continued)

OTHER PUBLICATIONS

Kaneko, Machine Translation of JP2016208795, Dec. 2016 (Year: 2016).*

(Continued)

*Primary Examiner* — Eric Johnson
(74) *Attorney, Agent, or Firm* — Meunier Carlin & Curfman LLC

(57) ABSTRACT

Various implementations include an axial flux machine including a rotor bearing a set of permanent magnets and a stator containing electro-magnetic coil assemblies disposed circumferentially at intervals about an axis. Each coil assembly has an axially extending stator tooth, one or more coils wound around the tooth, and one or more end shoes at an end of the stator tooth. The end shoes each have at least one circumferential edge adjacent a neighbouring coil assembly. In some implementations, radially innermost and outermost portions of the at least one circumferential edge are separated by a step projecting from the at least one circumferential edge. In some implementations, at least part of the at least one circumferential edge has a thickness less than a thickness of the inner radial edge thereby reducing a leakage flux between neighbouring electro-magnetic coil assemblies.

19 Claims, 4 Drawing Sheets

(51) Int. Cl.
*H02K 1/2798* (2022.01)
*H02K 21/24* (2006.01)
*H02K 29/03* (2006.01)

(56) References Cited

U.S. PATENT DOCUMENTS

| | | | |
|---|---|---|---|
| 2008/0136285 | A1 | 6/2008 | Tajima et al. |
| 2012/0126653 | A1 | 5/2012 | Yang et al. |
| 2014/0077666 | A1* | 3/2014 | Nishikawa ........... H02K 1/2795 310/67 R |
| 2017/0093259 | A1 | 3/2017 | Li et al. |
| 2019/0252930 | A1* | 8/2019 | Stetina ..................... H02K 3/50 |

FOREIGN PATENT DOCUMENTS

| | | | |
|---|---|---|---|
| EP | 2760112 | A1 | 7/2014 |
| GB | 2547421 | B | 8/2017 |
| JP | H05169205 | A | 7/1993 |
| JP | 2003303728 | A | 10/2003 |
| JP | 2006304421 | A * | 11/2006 |
| JP | 2016208795 | A * | 12/2016 ............... H02K 1/14 |
| WO | 2014/114942 | A2 | 7/2014 |
| WO | 2020/072734 | A1 | 4/2020 |
| WO | WO-2021089188 | A1 * | 5/2021 ............. H02K 1/146 |

OTHER PUBLICATIONS

Tanaka, Machine Translation of JP2006304421, Nov. 2006 (Year: 2006).*
Abdalmagid, Machine Translation of WO2021089188, May 2021 (Year: 2021).*
UK Intellectual Property Office. Combined Search and Examination Report issued in GB Application No. 2100859.4 on May 4, 2021. 7 pages.

* cited by examiner

AXIAL FLUX MACHINE SHOE OPTIMISATION

CROSS-REFERENCE TO RELATED APPLICATIONS

This application claims priority to and benefit of GB Patent Application No. 2100859.4, filed Jan. 22, 2021, which is incorporated by reference in its entirety.

FIELD

This invention relates to stator assemblies for axial flux permanent magnetic machines with reduced power loss, and to methods of making the same.

BACKGROUND

As described herein an axial flux permanent magnet machine may be a motor or a generator, Typically such a machine typically has disc- or ring-shaped rotor and stator structures arranged about an axis. The stator comprises a set of coils each parallel to the axis and the rotor bears a set of permanent magnets and is mounted on a bearing so that it can rotate about the axis driven by fields from the stator coils.

FIG. 1a shows the general configuration of an example axial flux machine with a pair of rotors R1, R2 to either side of a stator S, although a simple structure could omit one of the rotors. There is an air gap G between the rotor(s) and stator, and in an axial flux machine the direction of flux through the air gap is substantially axial. Another configuration (not shown) extends this arrangement and has three stators and two rotors. FIG. 1b shows an example configuration with a single rotor (which may have permanent magnets on both sides), and two stators one to either side of the rotor. Other variants are possible.

There are also various configurations of axial flux permanent magnet machine possible depending, for example, upon the arrangement of north and south poles on the rotor(s). FIG. 1c illustrates the basic configurations of a Torus NS machine, a Torus NN machine (which has a thicker yoke because the NN pole arrangement requires flux to flow through the thickness of the yoke), and a YASA (Yokeless and Segmented Armature) topology. The illustration of the YASA topology shows cross-sections through two coils, the cross-hatched area showing the windings around each coil. Here, dispensing with the stator yoke provides a substantial saving in weight and iron losses but there are drawbacks. One is loss of structural strength to the stator which the iron provided, even though there is potentially increased need for strength because the YASA topology is compact and can result in very large stresses. Another is loss of a route for heat to escape from stator coils, and coolant may therefore be circulated through the machine.

In such machines the gap between adjacent coils is generally minimised in order to reduce dead space. However smaller gaps between adjacent cons can inhibit heat loss. Also, when there is a small gap between adjacent shoes flux may leak from one coil to the next, ultimately leading to an increase in inductance. Under load, this leads to a higher voltage for otherwise the same currents, and reduces peak power output.

In addition, cogging torque and axial force ripple are dependent on both the magnet shape and shoe profile. Some approaches to minimise these harmonic effects, such as skewing the stator or the rotor, can negatively impact performance and/or costs. Moreover, large force ripples can excite rotor resonances, which can cause noise, vibration and harshness (NVH) issues at certain speeds. Further, many customers require the cogging torque to be below a certain value.

There is also a general need for designs with reduced losses and improved electrical efficiency. Background prior art is described in EP2760112A, JPH05169205A, JP2003303728A, CN110492629A, U.S. Pat. No. 7,233,090, GB2547421A, US2008/136285, US2017/093259, EP2618466A and related U.S. Pat. No. 8,878,415, and WO2020/072734.

SUMMARY

One way to address the flux leakage is to reduce a thickness of the stator shoes. However, in order to achieve the necessary mechanical robustness for the shoe there is usually a minimum required shoe thickness. Instead, the thickness of the shoe can be reduced locally in regions with the highest contribution to flux leakage between adjacent shoes.

According to a first aspect, an axial flux machine comprises a rotor bearing a set of permanent magnets and mounted for rotation about an axis of the axial flux machine, and a stator having a cavity formed between walls and containing therein a plurality electro-magnetic coil assemblies disposed circumferentially at intervals about the axis, wherein said rotor and said stator are spaced apart along said axis. Each of the electro-magnetic coil assemblies may comprise one or more axially extending stator teeth or bars, coils each wound around each of the stator teeth, and end shoes at an end of each of the stator teeth. Each of the end shoes may have at least one neighbouring end shoe separated circumferentially from it. The end shoe may further comprise a projection forming part of one or more of its circumferential edges, wherein the projection portion of the circumferential edge is separated from the rest of the circumferential edge by a step projecting from, e.g. projecting perpendicularly to, the circumferential edge.

Inclusion of the projected portion of the circumferential edge results in a smaller gap between neighbouring shoes. By providing a step separating the projected portion and the non-projected portion of the circumferential edge the cogging torque may be reduced.

According to another aspect, an axial flux machine comprises a rotor bearing a set of permanent magnets and mounted for rotation about an axis of the axial flux machine, and a stator having a cavity formed between walls and containing therein a plurality electro-magnetic coil assemblies disposed circumferentially at intervals about the axis, wherein said rotor and said stator are spaced apart along said axis. Each of the electro-magnetic coil assemblies may comprise one or more axially extending stator teeth or bars, coils each wound around each of the stator teeth, and end shoes at an end of each of the stator teeth. Each of the end shoes may have at least one neighbouring end shoe separated circumferentially from it. The end shoe may further comprise a projection forming part of one or more of its circumferential edges, where a thickness of the projection is less than a thickness of the inner radial edge of the end shoe.

The reduced thickness of the projection portion of the circumferential edge may reduce a leakage flux between neighbouring electro-magnetic coil assemblies. The use of a thinner projection to achieve this effect may help to maintain a mechanical robustness of the shoe as the thickness of the end shoe is only reduced locally.

The projection of the end shoe may form the radially outermost portion of the shoe's circumferential edge(s). Optionally, the radially innermost portion the circumferential edge may have a thickness greater than the projection, and approximately equal to the thickness of the inner radial edge of the shoe.

In some implementations, optimisation for axial force ripples and cogging torques requires a difference in the shoe-shoe gap at the inner radial edge as compared to the outer radial edge. Generally, the shoe-shoe gap at the outer radial end of the shoe may be minimised. Therefore, the thinner projected portion of the circumferential edge may project beyond the radially innermost portion of at least one circumferential edge. Optionally, this may include a step on, e.g. projecting perpendicular, to the circumferential edge separating the projection from the inner radial portion.

Each shoe generally comprises two surfaces, an inner surface adjacent to the stator teeth and an outer surface facing away from the stator teeth. As the projected portion of the circumferential edge is thinner than other parts of the shoe, a surface of the projected portion may be level to one or neither of the inner and outer surfaces of the shoe. In some implementations, the projection portion of the circumferential edge is located at a surface of the one or more end shoes axially closest to the rotor of the machine. In some implementations the projection portion may be located at the surface of the shoe axially closest to the permanent magnets of the machine.

In most machine topologies, the each end shoe is a part of a pair of end shoes associated with the same stator tooth. The end shoes will generally be at opposite ends of the stator tooth. Therefore, in one implementation the end shoes comprise a first end shoe at a first axial end of a stator tooth and a second end shoe at a second axial end of a stator tooth, wherein said first axial end and said second axial end are opposing ends of said stator tooth. In these implementations, the end shoes comprising each pair may be identical or they may be different. For example, the first end shoe may have its projected portions of its circumferential edge at its inner surface while the second end show may have its projected portions of its circumferential edge at its outer surface.

Generally, each end shoe may have two neighbouring end shoes separated circumferentially from its circumferential edges. In this implementation, each end shoe may comprise projected portions from each of its circumferential edges with a thickness less than a thickness of the inner radial edge of the end shoe.

The shoes may be formed from a soft magnetic composite material, and the axial flux machine may have a YASA (Yokeless and Segmented Armature) topology.

According to another aspect, there is provided a method of optimising a shoe shape in a stator assembly for an axial flux permanent magnet machine. The stator assembly may comprise a set of stator teeth arranged circumferentially around an axis, each stator tooth of the set of stator teeth extending radially from the axis. The stator may further comprise a set of shoes for the stator teeth and a set of coils each wound around a respective stator tooth. The shoe shape may be optimised by determining an axial force ripple at a plurality of radial distances from the axis for a plurality of shoe shapes, and combining the plurality of shoe shapes at one or more of the plurality of radial distances to determine an optimised shoe shape, the optimised shoe shape minimising an axial force ripple.

Beneficially, this method reduces the number of machines that are required to be simulated in order to find the optimal shoe profile for minimising the axial force ripple in a machine. In some implementations, the axial force ripple may be optimised within a set of constraints. These constraints may include, but are not limited to, manufacturing tolerances, cogging torque, the mechanical robustness of the shoes and/or back-EMF harmonics. For example, the method may further comprise determining a cogging torque at the plurality of radial distances from the axis for the plurality of shoe shapes, and combining the plurality of shoe shapes at one or more of the plurality of radial distances to determine the optimised shoe shape, the optimised shoe shape minimising a combination of the axial force ripple and the cogging torque.

In some implementations, the initial simulated shoe shapes may each produce a constant circumferential distance between neighbouring pairs of shoes in the stator. The circumferential distance may be constant for all radial distances along the end shoes. However, the distance between neighbouring end shoes may be different for each shoe shape of the plurality of shoe shapes.

The method may further be used to find an optimal magnet pole arc for a machine. In one implementation, the axial flux permanent magnet machine further comprises a rotor bearing a set of permanent magnets and mounted for rotation about the axis. The rotor and the stator are spaced apart along the axis to define a gap therebetween in which magnet flux in the machine is generally in an axial direction. The method comprises, for each of the plurality of shoe shapes, determining back-EMF harmonics for a plurality of magnet pole arcs of the permanent magnets, and determining an optimal magnet pole arc. The optimal magnet pole arc may, for example, minimise harmonic effects in the machine. Additionally or alternatively, the magnet pole arc may be optimised based on the axial force ripple and/or cogging torque of the machine.

According to another aspect, there is provided a method of making an axial flux permanent magnet machine comprising determining a shape of the shoes of the machine according to the second aspect, and making an axial flux permanent magnet machine with shoes of the determined shape.

The axial flux permanent magnet machine may have a YASA (Yokeless and Segmented Armature) topology.

BRIEF DESCRIPTION OF THE DRAWINGS

These and other aspects of the invention will now be further described, by way of example only, with reference to the accompanying figures in which:

FIGS. 2a and 2b show a schematic side view of a yokeless and segmented armature (YASA) machine, and a perspective view of the machine of FIG. 2a.

FIGS. 5a and b show an example stator end shoe optimised using the process of FIG. 4 based on

DETAILED DESCRIPTION OF THE EMBODIMENTS

Figure 1A:
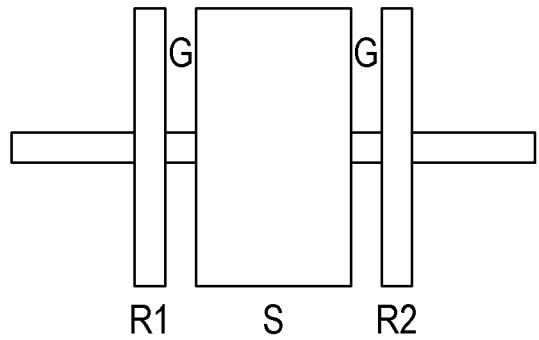
FIGS. 1a to 1c show, respectively, a general configuration of a two-rotor one-stator axial flux machine, a general configuration of a two-stator one-rotor axial flux machine, and example topologies for axial flux permanent magnet machines.
Figure 1B:
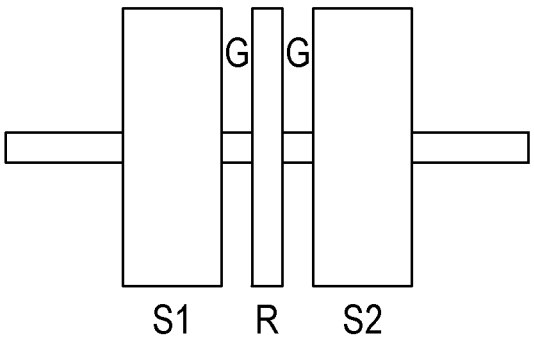
Figure 1C:
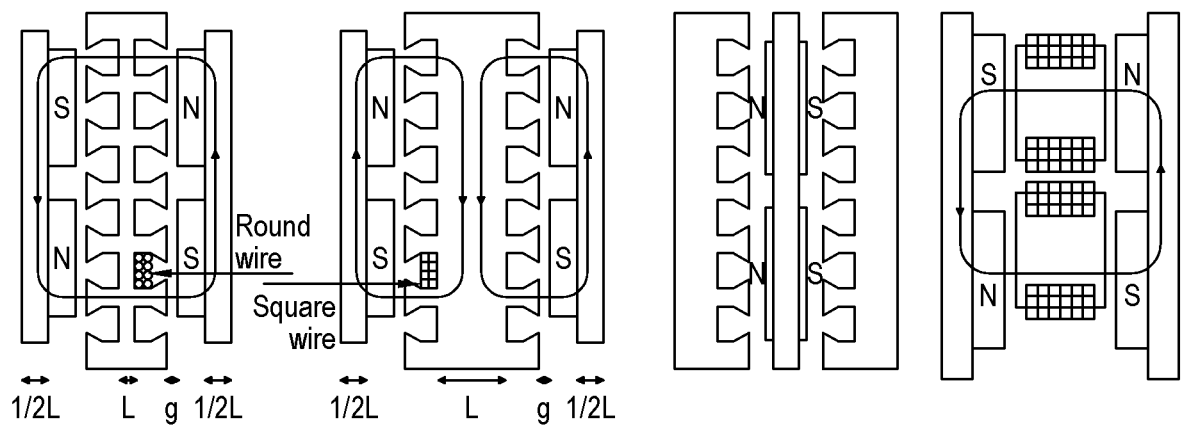
Figure 2A:
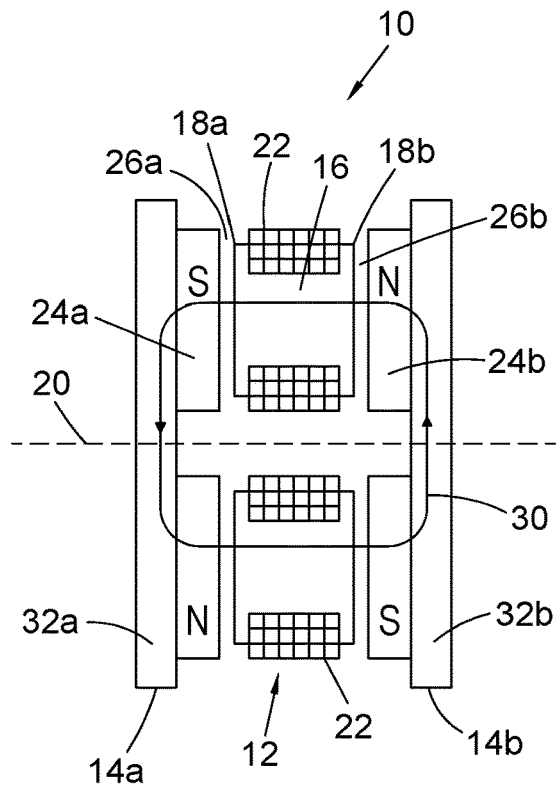
Figure 2B:
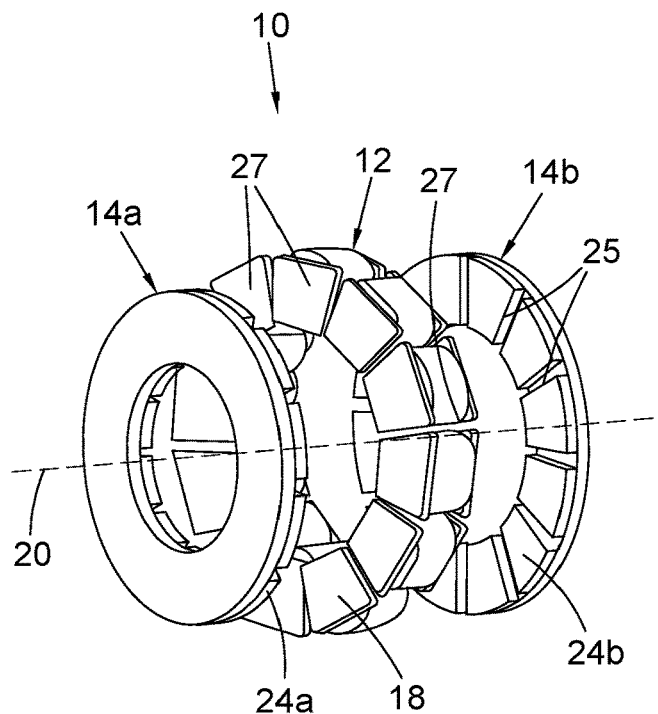

FIGS. 2a and 2b, which are taken from WO2012/022974, show schematic illustrations of an example yokeless and segmented armature (YASA) machine 10. The machine 10 may function either as a motor or as a generator.

The machine 10 comprises a stator 12 and, in this example, two rotors 14a,b. The stator 12 comprises a collection of separate stator teeth or bars 16 spaced circumferentially about a machine axis 20, which also defines an axis of the rotors 14a,b. Each tooth 16 carries a stator coil 22, and has an axis which is typically disposed parallel to the rotation axis 20. Each end 18a,b of the stator tooth is provided with a shoe 27, which helps to confine coils of the stator coil 22 and may also spread the magnetic field generated by the stator coil. The stator coil 22 may be formed from square or rectangular section insulated wire so that a high fill factor can be achieved. In a motor the stator coils 22 are connected to an electrical circuit (not shown) that energizes the coils so that poles of the magnetic fields generated by currents flowing in the stator coils are opposite in adjacent stator coils 22.

The two rotors 14a,b carry permanent magnets 24a,b that face one another with the stator coil 22 between. When the stator teeth are inclined (not as shown) the magnets are likewise inclined. Gaps 26a,b are present between respective shoe and magnet pairs 17/24a, 27/24b; these may be aft gaps, coolant-filled, or partially occupied by a stator housing wall. In an example motor the stator coils 22 are energized so that their polarity alternates to cause coils at different times to align with different magnet pairs, resulting in torque being applied between the rotor and the stator.

The rotors 14a,b are generally connected together, for example by a shaft (not shown), and rotate together about the machine axis 20 relative to the stator 12. In the illustrated example a magnetic circuit 30 is formed by two adjacent stator teeth 16, two magnet pairs 24a,b, and two back plates 32a,b, one for each rotor, linking the flux between the backs of each magnet pair 24a,b facing away from the respective coils 22. The back plates 32a,b may be referred to as back irons and comprise a magnetic material, typically a ferromagnetic material although not necessarily iron. This magnetic material is not required to be a permanent magnet. The stator coils 16 are enclosed within a housing which defines a chamber for the rotors and stator, and which may be supplied with a cooling medium.

Figure 3:
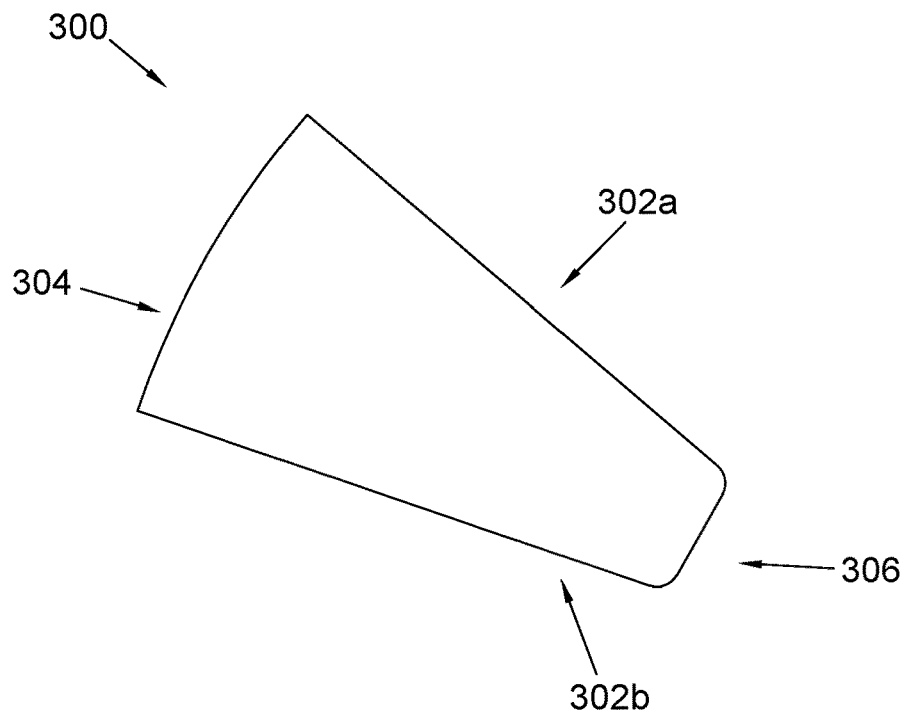
FIG. 3 shows an example of a prior art stator end shoe with a constant shoe-shoe gap.

FIG. 3 shows an example stator end shoe 300. Shoe 300 comprises an inner radial end 306, an outer radial end 304, and circumferential ends 302a, b. In a typical stator, shoe 300 will have two neighbouring shoes each adjacent to and spaced apart from one of circumferential ends 302a, b. Each of the neighbouring shoes generally have an identical profile. As a result, shoes in a typical stator for an axial flux motor are generally designed with a profile that produces a simple shoe-shoe gap geometry. For example, the shoe profile may provide a constant gap between adjacent shoes in a stator. Alternatively, the shoe-shoe gap may be tapered along the radial direction.

Generally, a gap between adjacent shoes 300 is as small as possible. However, when a gap between adjacent shoes is small, flux may leak from one coil to the next, ultimately leading to an increase in inductance. Under load, this leads to a higher voltage for otherwise the same currents, and reduces peak power output. In addition, cogging torque and axial force ripple are dependent on both the magnet shape and shoe profile. Large force ripples can excite rotor resonances, which can cause noise, vibration and harshness (NVH) issues at certain speeds. Furthermore, many customers require cowing torque to be below a certain value.

The shape of shoe 300 and the accompanying magnets may be optimised to give favourable harmonic performance, but it is difficult to optimise for all of cogging torque, axial force ripple and back-EMF harmonics, By providing a shoe with a more complex profile, both cogging torque and axial force ripple can be optimised.

Figure 4:
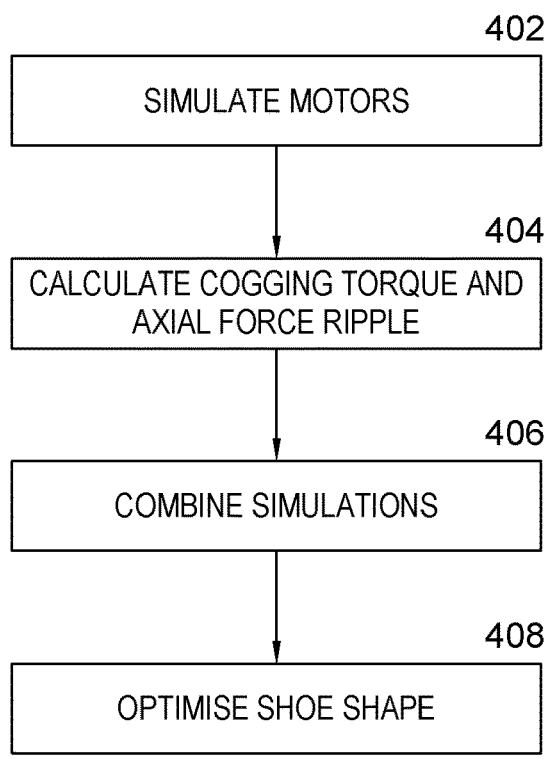
FIG. 4 shows a flowchart of the process for optimising the shoe shape according to an aspect.

FIG. 4 shows an example process for optimising a shape of a stator end shoe and/or magnet. In step 402, initial simulations may be performed for multiple motors. Each of the simulated motors has a constant shoe-shoe gap and a constant magnet pole arc or magnet width, however these values may vary between each of the simulated motors. The magnet pole arc or width is a measurement of the length of the radially outer edge of the permanent magnet.

In step 404, the contribution to the total cogging torque and axial force ripple may be calculated at a number of radii, for example via finite element analysis (FEA), and the overall cogging torque and axial force ripple for each simulation is the summation of the cogging torque and axial force ripple at all of the individual radii. Merely as an illustrative example, in a motor with a radius of 1 metre the components of cogging torque and axial force ripple may be calculated at 1 millimetre increments. The total cogging torque and axial force ripple in the simulated motor is the sum of the contributions of these 1 millimetre increments.

In step 406, the effect of having a non-constant magnet pole arc and/or a non-constant shoe-shoe gap can be determined by combining different parts of different simulations. For example, a first simulated motor $M_1$ may have a shoe-shoe gap of 10 millimetres, while a second simulated motor $M_2$ may have a shoe-shoe gap of 5 millimetres. As above, each motor has a total radius of 1 metre and the components of axial force ripple are calculated at 1 millimetre increments. One or more of the 1 millimetre increments of $M_1$ may be combined with one or more of the 1 millimetre increments for $M_2$. For example, each 1 millimetre increment between a radius of 0 and 0.5 metres from $M_1$ may be combined with each 1 millimetre increment between a radius of 0.5 and 1 metre from $M_2$. This combination is equivalent to a third motor $M_3$ with a shoe-shoe gap of 10 millimetres between a radius of 0 and 0.5 metres and a shoe-shoe gap of 5 millimetres between a radius of 0.5 and 1 metre. A total cogging torque and total axial force ripple for the combination is equal to the sum of the contributions of each of the combined 1 millimetre increments. As a result, the total cogging and total axial force ripple for $M_3$ can be calculated without the need to simulate $M_3$ or any additional FEA, both of which can be computationally expensive processes.

This process may be performed quickly enough to be carried out in an optimisation loop in step 408, with relevant constraints to given manufacturable components. The optimisation loop may comprise iteratively adjusting the combined parts selected from simulation in order to minimise the cogging torque and/or axial force ripple. For example, the optimisation may involve iteratively combining different sections of $M_1$ and $M_2$ in order to minimise the axial force ripple in $M_3$ without producing a cogging torque above a specified threshold.

In the examples above the magnet pole arc was maintained at a constant value. However, the process may be used to optimise for either or both of a non-constant magnet pole arc and a non-constant shoe-shoe gap, optionally within specified constraints.

In some implementations, the shoes may be formed from a soft magnetic composite (SMC) in order to reduce barriers to the manufacture of complex geometries to minimise flux leakage, and to optimise harmonic effects.

Figure 5A:
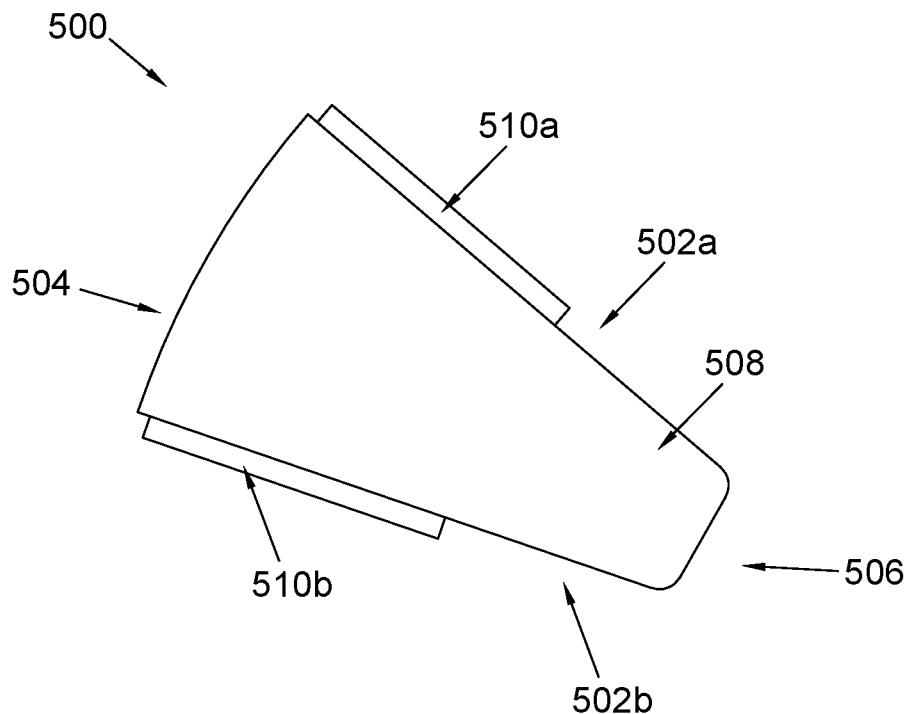

FIGS. 5a and b show a stator end shoe 500 according to one implementation. Shoe 500 has been optimised with constraints applied for the magnet shape according to one of YASA's typical machine designs, and optimised to minimise both cogging torque and axial force ripple.

Similarly to end shoe 300, shoe 500 comprises an inner radial end 506, outer radial end 504 and circumferential ends 502a, b. Generally, the main body 508 will have a minimum required thickness in order to achieve the necessary mechanical robustness for the shoe. This required thickness may vary depending on factors such as the shape of the shoe, size of the shoe and material of the shoe.

In this example, the optimisation for cogging torque and axial force ripple minimisation leads towards a difference between the shoe-shoe gap towards the inner radial diameter 506 and outer radial diameter 504 of the circumferential edges 502a, b. More generally, the shoe-shoe gap at the outer radial diameter 504 should be as small as possible. However, the small gap between the adjacent shoes leads to a low reluctance between the two neighbouring coils, as a result of flux leaking between the shoes. To reduce this, the thickness of the shoe can be reduced locally.

To this end, stator end shoe 500 further comprises projections or wings 510a, b protruding from the circumferential ends 502a, b of the main body 508. Wings 510a, b are produced from a step 512 along the or each circumferential edge of the shoe 500. As a result of this topography, the gap between neighbouring shoes is greater between the step 512 and the inner radial edge 506 than between the step 512 and the outer radial edge 504. In this implementation, step 512 may be approximately perpendicular to the edge of main body 508 in order to optimise the shoe-shoe gap for each section of the shoe 500.

Where the stator end shoe 500 includes the step 512, different parts of the shoe experience different cogging torque, that is the outer part of the shoe experiences a different cogging torque to the inner part of the shoe, and the cogging torque from one part of the shoe may partially cancel the cogging torque from the other part of the shoe. By adjusting the location of the step the relative contribution of these two different cogging torques can be adjusted, and the location of the step(s) 512 may be selected to optimise e.g. minimise the cogging torque.

While shoe 500 is depicted with two wings 510a, b, shoe 500 may more generally comprise one or more wings 510. In some embodiments, shoe 500 may be asymmetrical. For example, shoe 500 may include only a single wing projecting from just one of the circumferential ends.

Figure 5B:
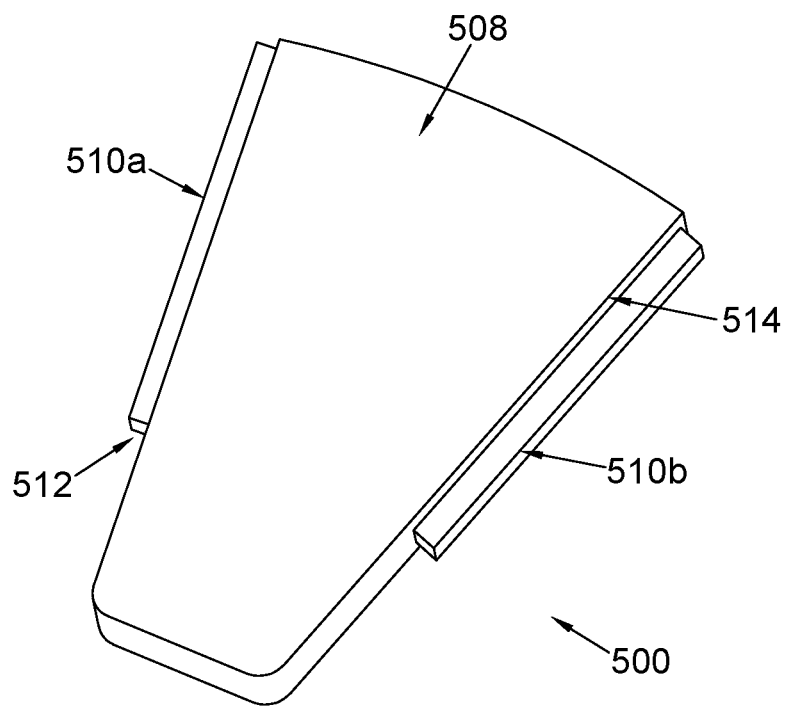

As shown in FIG. 5b, in this implementation wings 510a, b have a reduced thickness 514 compared to the main body 508. The thickness of wings 510a, b may be less than the minimum required thickness of the main body 508 of the shoe 500. This means that the thickness of wings 510a, b may be less than, for example, inner and/or outer ends 506 and 504 of the main body 508. This is because the localised nature of the reduced thickness does not significantly affect the mechanical robustness of the main body 508. Advantageously, this difference in thickness 514 may, among other benefits, increase the reluctance, thereby reducing the inductance and providing a power benefit. In most stators, shoe 500 will be part of a pair of shoes each adjacent to opposite ends of a stator tooth. As a result, each shoe further comprises an inner surface adjacent to the stator teeth and an outer surface facing away from the stator teeth. The wings 510a, b may be positioned such that they are as close to the rotor-stator air gap and/or magnets as possible. As a result, the shoes of the pair of shoes may not be identical. For example, a first shoe of the pair may be formed with a surface of the wings 510a, b level with its inner surface, while a second shoe of the pair may be formed with a surface of the wings 510a, b level with its outer surface. Alternatively, the shoes 500 in a pair of shoes may be identical, each having wings 510a, b level with the one of their inner and outer surfaces.

While FIGS. 5a and 5b show an example implementation comprising wings 510a, b with both a reduced thickness 514 and a step 512, other implementations may comprise only the reduced thickness 514 or the step 512. For example, one implementation may comprise wings 510a, b with a reduced thickness 514 that project along the whole length of the circumferential edge 502a, b between inner and outer radial ends 504 & 506. Alternatively, wings 510a, b may comprise step 512 but may have a thickness approximately equal to the thickness of the main body 508.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. An axial flux machine comprising:
   a rotor bearing a set of permanent magnets and mounted for rotation about an axis of the axial flux machine; and
   a stator having a cavity formed between walls of a stator housing and containing therein a plurality of electro-magnetic coil assemblies disposed circumferentially at intervals about the axis, wherein said rotor and said stator are spaced apart along said axis, each of the plurality of electro-magnetic coil assemblies comprising:
   an axially extending stator tooth;
   one or more coils each wound around the stator tooth; and
   one or more end shoes at an end of said stator tooth, said one or more end shoes each comprising an inner radial edge, an outer radial edge, and at least one circumferential edge adjacent to a neighbouring one of the plurality of electro-magnetic coil assembles;
   wherein the at least one circumferential edge comprises a radially innermost portion and a radially outermost portion, and
   wherein the radially innermost portion and the radially outermost portion are separated by a step projecting perpendicularly from the at least one circumferential edge, wherein the step has a thickness less than a thickness of the radially innermost portion of the at least one circumferential edge.

2. The axial flux machine of claim 1, wherein the radially innermost portion of the at least one circumferential edge has a thickness approximately equal to a thickness of the inner radial edge.

3. The axial flux machine of claim 2, wherein said radially outermost portion of the at least one circumferential edge of said shoe projects beyond said radially innermost portion of the at least one circumferential edge in a radial direction.

4. The axial flux machine of claim 1, wherein said radially innermost portion of the at least one circumferential edge of said shoe is located at a surface axially closest to said rotor.

5. The axial flux machine of claim 1, wherein said one or more end shoes comprise a first end shoe at a first axial end of said stator tooth and a second end shoe at a second axial end of said stator tooth,
   wherein said first axial end and said second axial end are opposing ends of said stator tooth.

6. The axial flux machine of claim 1, wherein said one or more end shoes are formed from a soft magnetic composite material.

7. The axial flux machine of claim 1, wherein said one or more end shoes each comprise two opposing circumferential edges adjacent to different neighbouring electro-magnetic coil assemblies,
wherein at least a part of each of the two circumferential edges has a thickness less than a thickness of the inner radial edge.

8. The axial flux machine of claim 1, wherein the axial flux machine has a YASA (Yokeless and Segmented Armature) topology.

9. A method of optimising a shoe shape of the one or more stator shoes of claim 1
the method comprising:
determining an axial force ripple at a plurality of radial distances from the axis for a plurality of shoe shapes; and
combining the plurality of shoe shapes at one or more of the plurality of radial distances to determine an optimised shoe shape, wherein the optimised shoe shape minimises an axial force ripple.

10. An axial flux machine comprising:
a rotor bearing a set of permanent magnets and mounted for rotation about an axis of the axial flux machine; and
a stator having a cavity formed between walls of a stator housing and containing therein a plurality of electro-magnetic coil assemblies disposed circumferentially at intervals about the axis, wherein said rotor and said stator are spaced apart along said axis, each of the plurality of electro-magnetic coil assemblies comprising:
an axially extending stator tooth;
one or more coils each wound around the stator tooth; and
one or more end shoes at an end of said stator tooth, said one or more end shoes each comprising an inner radial edge, an outer radial edge, and at least one circumferential edge adjacent to a neighboring one of the plurality of electro-magnetic coil assembles;
wherein the at least one circumferential edge comprises a radially innermost portion and a radially outermost portion;
wherein at least part of the at least one circumferential edge has a thickness less than a thickness of the radially innermost portion thereby reducing a leakage flux between neighboring electro-magnetic coil assemblies.

11. The axial flux machine of claim 10, wherein said part of the at least one circumferential edge comprises the radially outermost portion of the at least one circumferential edge.

12. The axial flux machine of claim 11, wherein the radially innermost portion of at least one circumferential edge has a thickness approximately equal to the thickness of the inner radial edge.

13. The axial flux machine of claim 12, wherein said part of the at least one circumferential edge of said shoe projects beyond said radially innermost portion of at least one circumferential edge in a radial direction.

14. The axial flux machine of claim 13, wherein said part of the at least one circumferential edge and said radially innermost portion of at least one circumferential edge are separated by a step on the at least one circumferential edge.

15. The axial flux machine of claim 10, wherein said part of the at least one circumferential edge of said shoe is located at a surface of the one or more end shoes axially closest to said rotor.

16. The axial flux machine of claim 10, wherein said one or more end shoes comprise a first end shoe at a first axial end of said stator tooth and a second end shoe at a second axial end of said stator tooth, and
wherein said first axial end and said second axial end are opposing ends of said stator tooth.

17. The axial flux machine of claim 10, wherein said one or more end shoes are formed from a soft magnetic composite material.

18. The axial flux machine of claim 10, wherein said one or more end shoes each comprise two opposing circumferential edges adjacent to different neighbouring electro-magnetic coil assemblies, and
wherein at least a part of each of the two circumferential edges has a thickness less than a thickness of the inner radial edge.

19. The axial flux machine of claim 10, wherein the axial flux machine has a YASA (Yokeless and Segmented Armature) topology.

* * * * *